US 010344230B2

(12) United States Patent
Solomon

(10) Patent No.: US 10,344,230 B2
(45) Date of Patent: Jul. 9, 2019

(54) FATTY ALCOHOLS AND ESTERS FOR CRUDE OIL TREATMENT

(71) Applicant: Ecolab USA Inc., St. Paul, MN (US)

(72) Inventor: Kim R. Solomon, River Falls, WI (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/705,762

(22) Filed: Sep. 15, 2017

(65) Prior Publication Data
US 2018/0079977 A1 Mar. 22, 2018

Related U.S. Application Data

(60) Provisional application No. 62/395,733, filed on Sep. 16, 2016.

(51) Int. Cl.
C10G 75/04 (2006.01)
F17D 1/17 (2006.01)
C09K 8/524 (2006.01)
F17D 3/12 (2006.01)

(52) U.S. Cl.
CPC .............. C10G 75/04 (2013.01); C09K 8/524 (2013.01); F17D 1/17 (2013.01); F17D 3/12 (2013.01)

(58) Field of Classification Search
CPC combination set(s) only.
See application file for complete search history.

(56) References Cited

U.S. PATENT DOCUMENTS

| 4,045,360 A * | 8/1977 | Fischer | C09K 8/524 166/304 |
|---|---|---|---|
| 4,997,580 A | 3/1991 | Karydas et al. | |
| 5,254,276 A | 10/1993 | Benjamin et al. | |
| 6,322,621 B1 | 11/2001 | Goldman | |
| 6,340,662 B1 | 1/2002 | Millhoff et al. | |
| 8,063,004 B2 | 11/2011 | Goldman | |
| 2008/0248979 A1 | 10/2008 | Nakagawa et al. | |
| 2010/0130385 A1 | 5/2010 | Guzmann et al. | |
| 2015/0344769 A1* | 12/2015 | Suresh | C09K 8/592 166/305.1 |

FOREIGN PATENT DOCUMENTS

| CN | 102994062 A | 3/2013 |
|---|---|---|
| CN | 105419756 A | 3/2016 |
| WO | 97/12947 | 4/1997 |
| WO | 2013/019704 A1 | 2/2013 |
| WO | 2016/069524 A1 | 5/2016 |

OTHER PUBLICATIONS

Bing, Wei, Recent advances on mitigating wax problem using polymeric wax crystal modifier, Journal of Petroleum Exploration and Production Technology, Dec. 2015, vol. 5, Issue 4, pp. 391-401.
International Search Report and Written Opinion dated Nov. 28, 2017 for PCT Patent Application No. PCT/US2017/051756, 13 pages.

* cited by examiner

Primary Examiner — Ellen M McAvoy
Assistant Examiner — Chantel L Graham
(74) Attorney, Agent, or Firm — Stinson LLP

(57) ABSTRACT

Compounds are provided that can be used in methods for reducing paraffin or wax deposition in crude oil during processing, storage, or transportation. More specifically, the method comprises contacting the crude oil with a composition in an amount effective to reduce paraffin or was deposition.

20 Claims, 1 Drawing Sheet

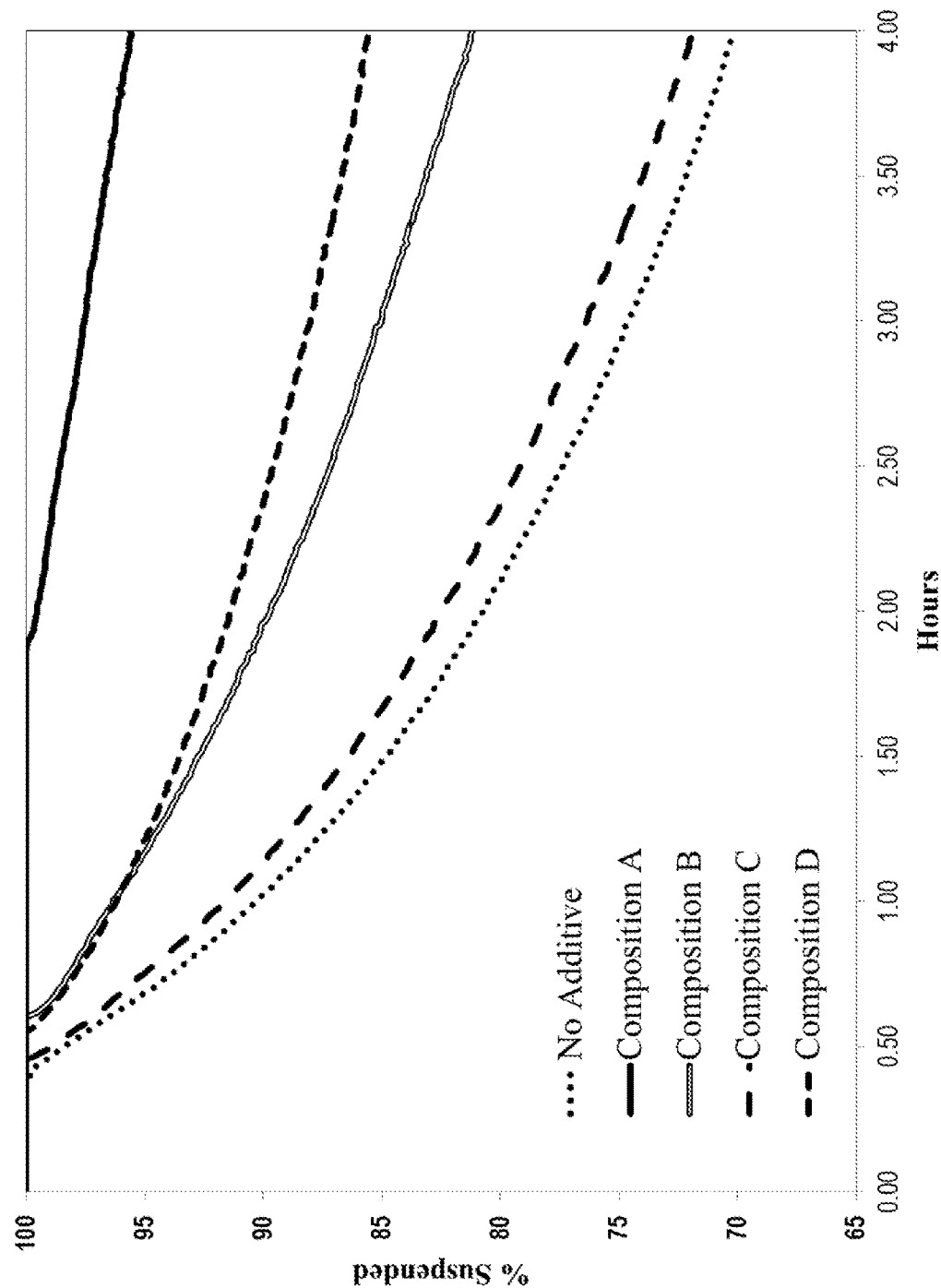

FATTY ALCOHOLS AND ESTERS FOR CRUDE OIL TREATMENT

CROSS-REFERENCE TO RELATED APPLICATION

This application claims priority to U.S. Provisional Patent Application Ser. No. 62/395,733 filed on Sep. 16, 2016, the disclosure of which is incorporated herein by reference in its entirety.

FIELD OF THE INVENTION

Fatty alcohols and esters are provided and can be used in methods for reducing paraffin or wax deposition in crude oil processing, storage, or transportation. The methods comprise contacting the crude oil with a composition comprising a fatty alcohol or ester in an amount effective to reduce paraffin or wax deposition.

BACKGROUND OF THE INVENTION

Within the petroleum industry, crystallization, and wax deposits can occur within upstream or downstream operations. Paraffin wax is most commonly used to describe this type of deposit. Paraffin wax is commonly comprised of long, straight or branched alkane compounds in the range of $C_{18}H_{38}$ to $C_{60}H_{122}$ that are naturally present in crude oils.

Paraffin wax is usually soluble in crude oil under "downhole" conditions. Ordinarily, as the crude oil is brought to the surface, its temperature is reduced and the crude oil is subjected to a diminished pressure. As the crude oil leaves the wellhead at the reduced pressure, dissolved gases, which act as natural solubilizers for paraffin wax, tend to come out of solution. These two factors, the decrease in temperature and the loss of dissolved gases, decrease the ability of the remaining crude oil to keep the paraffin wax in solution. As a result, wax crystals may precipitate on any appropriate surface.

When the paraffin waxes precipitate, they cause a myriad of problems for the oil producer. These deposits can cause numerous problems including blocking pores in near-well formations, production tubing, and downstream pipelines, cause a reduction or plugging of pipework, increase fluid viscosity, reduce operational efficiency, create a safety hazard, and associated disposal problems when the deposits are removed. Further, these deposits can create flow restrictions by depositing or accumulating downhole on tubing, rods, and sub-surface pumps; and above ground in valves, piping, separators, and storage tanks. Additionally, these deposits can also increase fluid viscosity, increase operating cost as efficiency is decreased, and also reduce pump efficiency. These troublesome deposits are combinations of an array of molecular weight hydrocarbons and adsorbed impurities.

There are numerous ways to control wax formation and deposits in upstream and downstream operations. Additives can be added to interfere with the crystallization process of the wax and suspend wax crystals in the oil. However, many of these additives are complex polymers which can be complicated to manufacture and are often difficult to formulate into a crude oil treatment product.

Therefore, a need exists to develop compositions comprising simple molecules that function as a wax crystallization inhibitor or suspending agent.

SUMMARY OF THE INVENTION

Fatty alcohols and esters are provided that can be used in a method for reducing paraffin or wax deposition in crude oil during processing, storage, or transportation, the method comprises contacting the crude oil with a composition in an amount effective to reduce paraffin or wax deposition, wherein the composition comprises a non-polymeric compound of Formula (I):

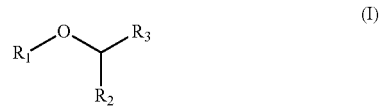

wherein $R_1$ is hydrogen or $-C(O)R_4$; $R_2$ is hydrogen or alkyl; $R_3$ is $C_8$ to $C_{60}$ alkyl or $C_8$ to $C_{60}$ alkenyl; and $R_4$ is alkyl.

Other objects and features will be in part apparent and in part pointed out hereinafter.

BRIEF DESCRIPTION OF THE DRAWINGS

FIG. 1 is a graph of percent of solids suspended vs. time (hours) for compositions A-D.

Corresponding reference characters indicate corresponding parts throughout the drawings.

DESCRIPTION OF THE PREFERRED EMBODIMENTS

Various agents for reducing paraffin or wax deposition in crude oil during processing, storage, or transportation are provided. High melting point alkanes that are components of various crude oils can deposit as a paraffin wax on surfaces of piping, storage tanks, and transport vehicles. The solid paraffins reduce the effective volume of the crude oil and reduce the amount of hydrocarbon products that can be refined into higher value components. The temperature where the wax appears is the wax appearance temperature (WAT). The WAT is specific to a particular crude oil and can have different values depending on the source of the crude oil and its environment. The formation of paraffin wax can be reduced by interrupting the crystallization process of the wax and suspending wax crystals in the oil. Usually, wax inhibitors are polymers, but polymers can be difficult to formulate and deploy into refining systems in contact with the crude oils. Thus, fatty alcohols or esters are provided that reduce paraffin or wax deposition in crude oil by suspending the paraffin wax in the crude oil. These compounds are believed to interfere with the crystal growth of paraffin wax by interaction of the alkyl group with waxy alkane groups and by having the hydroxyl or ester groups act as a crystal growth inhibitor.

Compounds are provided that can be used in a method for reducing paraffin or wax deposition in crude oil during processing, storage, or transportation, the method comprises contacting the crude oil with a composition in an amount effective to reduce paraffin or wax deposition, wherein the composition comprises a compound of Formula (I):

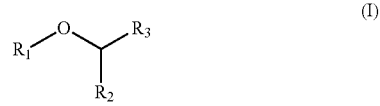

wherein $R_1$ is hydrogen or —C(O)$R_4$; $R_2$ is hydrogen or alkyl; $R_3$ is $C_8$ to $C_{60}$ alkyl or $C_8$ to $C_{60}$ alkenyl; and $R_4$ is alkyl.

The paraffin or wax deposition is reduced by suspension of the paraffin or wax in the crude oil.

The compound of Formula (I) can have $R_1$ be hydrogen.

The compound of Formula (I) can have $R_1$ be —C(O)$R_4$ and $R_4$ is $C_1$ to $C_8$ alkyl.

The compound of Formula (I) can have $R_1$ be acetyl.

The compound of Formula (I) can have $R_2$ be hydrogen.

The compound of Formula (I) can have $R_2$ be methyl or ethyl.

The compound of Formula (I) can have $R_3$ be $C_8$ to $C_{24}$ alkyl or $C_8$ to $C_{24}$ alkenyl.

The compound of Formula (I) can have $R_3$ be octyl, nonyl, decyl, undecyl, dodecyl, tetradecyl, hexadecyl, octadecyl, icosyl, docosyl, tetracosyl, or hexacosyl.

The compound of Formula I can comprise 1-decanol, 1-undecanol, 1-dodecanol, 1-tetradecanol, 1-hexadecanol, 1-octadecanol, 2-undecanol, 2-dodecanol, 3-dodecanol, 2-heptadecanol, 3-octadecanol, decyl acetate, undecyl acetate, dodecyl acetate, tetradecyl acetate, hexadecyl acetate, ocetadecyl acetate, undecan-2-yl acetate, dodecan-3-yl acetate, heptadecan-2-yl acetate, octadecan-3-yl acetate, or a combination thereof.

The compound of Formula I can comprise dodecyl acetate, 1-dodecanol], or a combination thereof.

The compound of Formula I can comprise dodecyl acetate.

The compound of Formula I can comprise 1-dodecanol.

The compound of Formula I can be a liquid at moderate ambient temperatures.

The moderate ambient temperature is from about 20° C. to about 43° C.

The crude oil has a wax appearance temperature of about 20° C. to about 50° C.

The composition can further comprise a surfactant, a solvent, or a combination thereof.

The solvent of the composition can comprise xylene, light naphtha, kerosene, liquid alkanes, diesel, lubricating oils, bitumen, or a combination thereof.

The composition comprising the compound of Formula 1 can be free of xylene, light naphtha, kerosene, liquid alkanes, diesel, lubricating oils, or bitumen.

The composition can contain from about 1 wt. % to about 100 wt. %, from about 1 wt. % to about 90 wt. %, from about 1 wt. % to about 85 wt. %, from about 10 wt. % to about 100 wt. %, from about 10 wt. % to about 90 wt. %, from about 10 wt. % to about 85 wt. %, from about 20 wt. % to about 100 wt. %, from about 20 wt. % to about 90 wt. %, from about 20 wt. % to about 85 wt. %, from about 30 wt. % to about 100 wt. %, from about 30 wt. % to about 90 wt. %, from about 30 wt. % to about 85 wt. %, from about 40 wt. % to about 100 wt. %, from about 40 wt. % to about 90 wt. %, from about 40 wt. % to about 85 wt. %, from about 50 wt. % to about 100 wt. %, from about 50 wt. % to about 90 wt. %, from about 50 wt. % to about 85 wt. %, from about 65 wt. % to about 100 wt. %, from about 65 wt. % to about 90 wt. %, or from about 65 wt. % to about 85 wt. % of a compound of Formula I.

The concentration can be contacted with the crude oil at a concentration from about 1 ppm to about 10,000 ppm, from about 1 ppm to about 5,000 ppm, from about 1 ppm to about 2,500 ppm, from about 1 ppm to about 1,000 ppm, from about 5 ppm to about 5,000 ppm, from about 5 ppm to about 2,500 ppm, from about 5 ppm to about 2,500 ppm, from about 5 ppm to about 1,000 ppm, from about 10 ppm to about 2,500 ppm, or from about 10 ppm to about 1,000 ppm based on the total weight of the crude oil.

The storage or transportation vessel can be a vessel used to store or transport a crude oil, including but not limited to a storage tank, rail car, tank truck, marine vessel, barge, or pipeline. Preferably the composition can be added to a crude oil contained in a storage tank, rail car, or tank truck.

The composition can comprise an effective amount of the compound of formula (1) and a component selected from the group consisting of an organic solvent, a corrosion inhibitor, an asphaltene inhibitor, a paraffin inhibitor, a scale inhibitor, an emulsifier, a water clarifier, a dispersant, an emulsion breaker, a gas hydrate inhibitor, a biocide, a pH modifier, a surfactant, and a combination thereof.

The composition can comprise from about 20 to about 90 wt. % of one or more compounds of formula (1) and from about 10 to about 80 wt. % of the component, preferably from about 50 to about 90 wt. % of one or more compounds of formula (1) and from about 10 to about 50 wt. % of the component, and more preferably from about 65 to about 85 wt. % of one or more compounds of formula (1) and from about 15 to about 35 wt. % of the component.

The component of the composition can comprise an organic solvent. The composition can comprise from about 1 to 80 wt. %, from about 5 to 50 wt. %, or from about 10 to 35 wt. % of the one or more organic solvents, based on total weight of the composition. The organic solvent can comprise an alcohol, a hydrocarbon, a ketone, an ether, an alkylene glycol, a glycol ether, an amide, a nitrile, a sulfoxide, an ester, or a combination thereof. Examples of suitable organic solvents include, but are not limited to, methanol, ethanol, propanol, isopropanol, butanol, 2-ethylhexanol, hexanol, octanol, decanol, 2-butoxyethanol, methylene glycol, ethylene glycol, 1,2-propylene glycol, 1,3-propylene glycol, diethyleneglycol monomethyl ether, diethylene glycol monoethyl ether, ethylene glycol monobutyl ether, ethylene glycol dibutyl ether, pentane, hexane, cyclohexane, methylcyclohexane, heptane, decane, dodecane, diesel, toluene, xylene, heavy aromatic naphtha, cyclohexanone, diisobutylketone, diethyl ether, propylene carbonate, N-methylpyrrolidinone, N,N-dimethylformamide, or a combination thereof.

The component of the composition can comprise a corrosion inhibitor. The composition can comprise from about 0.1 to 20 wt. %, 0.1 to 10 wt. %, or 0.1 to 5 wt. % of the corrosion inhibitors, based on total weight of the composition. A composition of the invention can comprise from 0.1 to 10 percent by weight of the corrosion inhibitors, based on total weight of the composition. The composition can comprise 1.0 wt %, 1.5 wt %, 2.0 wt %, 2.5 wt %, 3.0 wt %, 3.5 wt %, 4.0 wt %, 4.5 wt %, 5.0 wt %, 5.5 wt %, 6.0 wt %, 6.5 wt %, 7.0 wt %, 7.5 wt %, 8.0 wt %, 8.5 wt %, 9.0 wt %, 9.5 wt %, 10.0 wt %, 10.5 wt %, 11.0 wt %, 11.5 wt %, 12.0 wt %, 12.5 wt %, 13.0 wt %, 13.5 wt %, 14.0 wt %, 14.5 wt %, or 15.0 wt % by weight of the corrosion inhibitors, based on total weight of the composition. Each system can have its own requirements, and the weight percent of one or more additional corrosion inhibitors in the composition can vary with the system in which it is used.

The corrosion inhibitor can comprise an imidazoline compound, a quaternary ammonium compound, a pyridinium compound, or a combination thereof.

The corrosion inhibitor component can comprise an imidazoline. The imidazoline can be, for example, imidazoline derived from a diamine, such as ethylene diamine (EDA), diethylene triamine (DETA), triethylene tetraamine (TETA) etc. and a long chain fatty acid such as tall oil fatty acid (TOFA). The imidazoline can be an imidazoline of Formula (I) or an imidazoline derivative. Representative imidazoline derivatives include an imidazolinium compound of Formula (II) or a bis-quaternized compound of Formula (III).

The corrosion inhibitor component can include an imidazoline of Formula (I):

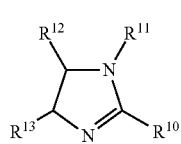

wherein $R^{10}$ is a $C_1$-$C_{20}$ alkyl or a $C_1$-$C_{20}$ alkoxyalkyl group; $R^{11}$ is hydrogen, $C_1$-$C_6$ alkyl, $C_1$-$C_6$ hydroxyalkyl, or $C_1$-$C_6$ arylalkyl; and $R^{12}$ and $R^{13}$ are independently hydrogen or a $C_1$-$C_6$ alkyl group. Preferably, the imidazoline includes an $R^{10}$ which is the alkyl mixture typical in tall oil fatty acid (TOFA), and $R^{11}$, $R^{12}$ and $R^{13}$ are each hydrogen.

The corrosion inhibitor component can include an imidazolinium compound of Formula (II):

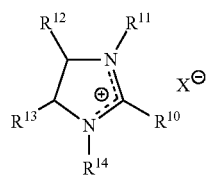

wherein $R^{10}$ is a $C_1$-$C_{20}$ alkyl or a $C_1$-$C_{20}$ alkoxyalkyl group; $R^{11}$ and $R^{14}$ are independently hydrogen, $C_1$-$C_6$ alkyl, $C_1$-$C_6$ hydroxyalkyl, or $C_1$-$C_6$ arylalkyl; $R^{12}$ and $R^{13}$ are independently hydrogen or a $C_1$-$C_6$ alkyl group; and $X^-$ is a halide (such as chloride, bromide, or iodide), carbonate, sulfonate, phosphate, or the anion of an organic carboxylic acid (such as acetate). Preferably, the imidazolinium compound includes 1-benzyl-1-(2-hydroxyethyl)-2-tall-oil-2-imidazolinium chloride.

The corrosion inhibitor can comprise a bis-quaternized compound having the formula (III):

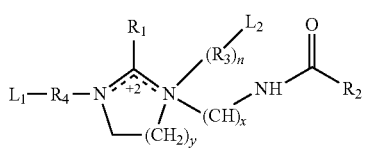

wherein $R_1$ and $R_2$ are each independently unsubstituted branched, chain or ring alkyl or alkenyl having from 1 to about 29 carbon atoms; partially or fully oxygenized, sulfurized, and/or phosphorylized branched, chain, or ring alkyl or alkenyl having from 1 to about 29 carbon atoms; or a combination thereof; $R_3$ and $R_4$ are each independently unsubstituted branched, chain or ring alkylene or alkenylene having from 1 to about 29 carbon atoms; partially or fully oxygenized, sulfurized, and/or phosphorylized branched, chain, or ring alkylene or alkenylene having from 1 to about 29 carbon atoms; or a combination thereof; $L_1$ and $L_2$ are each independently absent, H, —COOH, —SO$_3$H, —PO$_3$H$_2$, —COOR$_5$, —CONH$_2$, —CONHR$_5$, or —CON(R$_5$)$_2$; $R_5$ is each independently a branched or unbranched alkyl, aryl, alkylaryl, alkylheteroaryl, cycloalkyl, or heteroaryl group having from 1 to about 10 carbon atoms; n is 0 or 1, and when n is 0, $L_2$ is absent or H; x is from 1 to about 10; and y is from 1 to about 5. Preferably, $R_1$ and $R_2$ are each independently $C_6$-$C_{22}$ alkyl, $C_8$-$C_{20}$ alkyl, $C_{12}$-$C_{18}$ alkyl, $C_{16}$-$C_{18}$ alkyl, or a combination thereof; $R_3$ and $R_4$ are $C_1$-$C_{10}$ alkylene, $C_2$-$C_8$ alkylene, $C_2$-$C_6$ alkylene, or $C_2$-$C_3$ alkylene; n is 0 or 1; x is 2; y is 1; $R_3$ and $R_4$ are —C$_2$H$_2$—; $L_1$ is —COOH, —SO$_3$H, or —PO$_3$H$_2$; and $L_2$ is absent, H, —COOH, —SO$_3$H, or —PO$_3$H$_2$. For example, $R_1$ and $R_2$ can be derived from a mixture of tall oil fatty acids and are predominantly a mixture of $C_{17}H_{33}$ and $C_{17}H_{31}$ or can be $C_{16}$-$C_{18}$ alkyl; $R_3$ and $R_4$ can be $C_2$-$C_3$ alkylene such as —C$_2$H$_2$—; n is 1 and $L_2$ is —COOH or n is 0 and $L_2$ is absent or H; x is 2; y is 1; $R_3$ and $R_4$ are —C$_2$H$_2$—; and $L_1$ is —COOH.

It should be appreciated that the number of carbon atoms specified for each group of formula (III) refers to the main chain of carbon atoms and does not include carbon atoms that may be contributed by substituents.

The corrosion inhibitor can comprise a bis-quaternized imidazoline compound having the formula (III) wherein $R_1$ and $R_2$ are each independently $C_6$-$C_{22}$ alkyl, $C_8$-$C_{20}$ alkyl, $C_{12}$-$C_{18}$ alkyl, or $C_{16}$-$C_{18}$ alkyl or a combination thereof; $R_4$ is $C_1$-$C_{10}$ alkylene, $C_2$-$C_8$ alkylene, $C_2$-$C_6$ alkylene, or $C_2$-$C_3$ alkylene; x is 2; y is 1; n is 0; $L_1$ is —COOH, —SO$_3$H, or —PO$_3$H$_2$; and $L_2$ is absent or H. Preferably, a bis-quaternized compound has the formula (III) wherein $R_1$ and $R_2$ are each independently $C_{16}$-$C_{18}$ alkyl; $R_4$ is —C$_2$H$_2$—; x is 2; y is 1; n is 0; $L_1$ is —COOH, —SO$_3$H, or —PO$_3$H$_2$ and $L_2$ is absent or H.

The corrosion inhibitor can be a quaternary ammonium compound of Formula (IV):

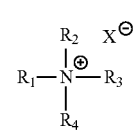

wherein $R_1$, $R_2$, and $R_3$ are independently $C_1$ to $C_{20}$ alkyl, $R_4$ is methyl or benzyl, and $X^-$ is a halide or methosulfate.

Suitable alkyl, hydroxyalkyl, alkylaryl, arylalkyl or aryl amine quaternary salts include those alkylaryl, arylalkyl and aryl amine quaternary salts of the formula [N$^+$R$^{5a}$R$^{6a}$R$^{7a}$R$^{8a}$][X$^-$] wherein R$^{5a}$, R$^{6a}$, R$^{7a}$, and R$^{8a}$ contain one to 18 carbon atoms, and X is Cl, Br or I. For the quaternary salts, R$^{5a}$, R$^{6a}$, R$^{7a}$, and R$^{8a}$ can each be independently selected from the group consisting of alkyl (e.g., $C_1$-$C_{18}$ alkyl), hydroxyalkyl (e.g., $C_1$-$C_{18}$ hydroxyalkyl), and arylalkyl (e.g., benzyl). The mono or polycyclic aromatic amine salt with an alkyl or alkylaryl halide include salts of the formula [N$^+$R$^{5a}$R$^{6a}$R$^{7a}$R$^{8a}$][X$^-$] wherein R$^{5a}$, R$^{6a}$, R$^{7a}$, and R$^{8a}$ contain one to 18 carbon atoms and at least one aryl group, and X is Cl, Br or I.

Suitable quaternary ammonium salts include, but are not limited to, a tetramethyl ammonium salt, a tetraethyl ammonium salt, a tetrapropyl ammonium salt, a tetrabutyl ammonium salt, a tetrahexyl ammonium salt, a tetraoctyl ammonium salt, a benzyltrimethyl ammonium salt, a benzyltriethyl ammonium salt, a phenyltrimethyl ammonium salt, a phenyltriethyl ammonium salt, a cetyl benzyldimethyl ammonium salt, a hexadecyl trimethyl ammonium salt, a dimethyl alkyl benzyl quaternary ammonium salt, a monomethyl dialkyl benzyl quaternary ammonium salt, or a trialkyl benzyl quaternary ammonium salt, wherein the alkyl group has about 6 to about 24 carbon atoms, about 10 and about 18 carbon atoms, or about 12 to about 16 carbon atoms. The quaternary ammonium salt can be a benzyl trialkyl quaternary ammonium salt, a benzyl triethanolamine quaternary ammonium salt, or a benzyl dimethylaminoethanolamine quaternary ammonium salt.

The corrosion inhibitor component can comprise a pyridinium salt such as those represented by Formula (V):

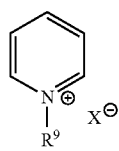

(V)

wherein $R^9$ is an alkyl group, an aryl group, or an arylalkyl group, wherein said alkyl groups have from 1 to about 18 carbon atoms and $X^-$ is a halide such as chloride, bromide, or iodide. Among these compounds are alkyl pyridinium salts and alkyl pyridinium benzyl quats. Exemplary compounds include methyl pyridinium chloride, ethyl pyridinium chloride, propyl pyridinium chloride, butyl pyridinium chloride, octyl pyridinium chloride, decyl pyridinium chloride, lauryl pyridinium chloride, cetyl pyridinium chloride, benzyl pyridinium chloride and an alkyl benzyl pyridinium chloride, preferably wherein the alkyl is a $C_1$-$C_6$ hydrocarbyl group. Preferably, the pyridinium compound includes benzyl pyridinium chloride.

The corrosion inhibitor components can include additional corrosion inhibitors such as phosphate esters, monomeric or oligomeric fatty acids, or alkoxylated amines.

The corrosion inhibitor component can comprise a phosphate ester. Suitable mono-, di- and tri-alkyl as well as alkylaryl phosphate esters and phosphate esters of mono, di, and triethanolamine typically contain between from 1 to about 18 carbon atoms. Preferred mono-, di-and trialkyl phosphate esters, alkylaryl or arylalkyl phosphate esters are those prepared by reacting a $C_3$-$C_{18}$ aliphatic alcohol with phosphorous pentoxide. The phosphate intermediate interchanges its ester groups with triethylphosphate producing a more broad distribution of alkyl phosphate esters.

Alternatively, the phosphate ester can be made by admixing with an alkyl diester, a mixture of low molecular weight alkyl alcohols or diols. The low molecular weight alkyl alcohols or diols preferably include $C_6$ to $C_{10}$ alcohols or diols. Further, phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine are preferred.

The corrosion inhibitor component can include a monomeric or oligomeric fatty acid. Preferred monomeric or oligomeric fatty acids are $C_{14}$-$C_{22}$ saturated and unsaturated fatty acids as well as dimer, trimer and oligomer products obtained by polymerizing one or more of such fatty acids.

The corrosion inhibitor component can comprise an alkoxylated amine. The alkoxylated amine can be an ethoxylated alkyl amine. The alkoxylated amine can be ethoxylated tallow amine.

The component of the composition can comprise an organic sulfur compound, such as a mercaptoalkyl alcohol, mercaptoacetic acid, thioglycolic acid, 3,3'-dithiodipropionic acid, sodium thiosulfate, thiourea, L-cysteine, tert-butyl mercaptan, sodium thiosulfate, ammonium thiosulfate, sodium thiocyanate, ammonium thiocyanate, sodium metabisulfite, or a combination thereof. Preferably, the mercaptoalkyl alcohol comprises 2-mercaptoethanol. The organic sulfur compound can constitute 0.5 to 15 wt. % of the composition, based on total weight of the composition, preferably about 1 to about 10 wt. % and more preferably about 1 to about 5 wt. %. The organic sulfur compound can constitute 1, 2, 3, 4, 5, 6, 7, 8, 9, 10, 11, 12, 13, 14 or 15 wt. % of the composition.

The composition can be substantially free of or free of any organic sulfur compound other than the compound of formula (1). A composition is substantially free of any organic sulfur compound if it contains an amount of organic sulfur compound below the amount that will produce hydrogen sulfide gas upon storage at a temperature of 25° C. and ambient pressure.

The component of the composition can further include a demulsifier. Preferably, the demulsifier comprises an oxyalkylate polymer, such as a polyalkylene glycol. The demulsifier can constitute from about 0.1 to 10 wt. %, from about 0.5 to 5 wt. %, or from about 0.5 to 4 wt. % of the composition, based on total weight of the composition. The demulsifier can constitute 0.5, 1, 1.5, 2, 2.5, 3, 3.5, 4, 4.5 or 5 wt. % of the composition.

The component of the composition can include an asphaltene inhibitor. The composition can comprise from about 0.1 to 10 wt. %, from about 0.1 to 5 wt. %, or from about 0.5 to 4 wt. % of an asphaltene inhibitor, based on total weight of the composition. Suitable asphaltene inhibitors include, but are not limited to, aliphatic sulfonic acids; alkyl aryl sulfonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

The component of the composition can include an additional paraffin inhibitor. The composition can comprise from about 0.1 to 10 wt. %, from about 0.1 to 5 wt. %, or from about 0.5 to 4 wt. % of an additional paraffin inhibitor, based on total weight of the composition. Suitable additional paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable paraffin dispersants include, but are not limited to, dodecyl benzene sulfonate, oxyalkylated alkylphenols, and oxyalkylated alkylphenolic resins.

The component of the composition can include a scale inhibitor. The composition can comprise from about 0.1 to 20 wt. %, from about 0.5 to 10 wt. %, or from about 1 to 10 wt. % of a scale inhibitor, based on total weight of the composition. Suitable scale inhibitors include, but are not limited to, phosphates, phosphate esters, phosphoric acids, phosphonates, phosphonic acids, polyacrylamides, salts of acrylamidomethyl propane sulfonate/acrylic acid copolymer (AMPS/AA), phosphinated maleic copolymer (PHOS/MA), and salts of a polymaleic acid/acrylic acid/acrylamidomethyl propane sulfonate terpolymer (PMA/AA/AMPS).

The component of the composition can include an emulsifier. The composition can comprise from about 0.1 to 10 wt. %, from about 0.5 to 5 wt. %, or from about 0.5 to 4 wt. % of an emulsifier, based on total weight of the composition. Suitable emulsifiers include, but are not limited to, salts of carboxylic acids, products of acylation reactions between carboxylic acids or carboxylic anhydrides and amines, and alkyl, acyl and amide derivatives of saccharides (alkylsaccharide emulsifiers).

The component of the composition can include a water clarifier. The composition can comprise from about 0.1 to 10 wt. %, from about 0.5 to 5 wt. %, or from about 0.5 to 4 wt. % of a water clarifier, based on total weight of the composition. Suitable water clarifiers include, but are not limited to, inorganic metal salts such as alum, aluminum chloride, and aluminum chlorohydrate, or organic polymers such as acrylic acid based polymers, acrylamide based polymers, polymerized amines, alkanolamines, thiocarbamates, and cationic polymers such as diallyldimethylammonium chloride (DADMAC).

The component of the composition can include a dispersant. The composition can comprise from about 0.1 to 10 wt. %, from about 0.5 to 5 wt. %, or from about 0.5 to 4 wt. % of a dispersant, based on total weight of the composition. Suitable dispersants include, but are not limited to, aliphatic phosphonic acids with 2-50 carbons, such as hydroxyethyl diphosphonic acid, and aminoalkyl phosphonic acids, e.g. polyaminomethylene phosphonates with 2-10 N atoms e.g. each bearing at least one methylene phosphonic acid group; examples of the latter are ethylenediamine tetra(methylene phosphonate), diethylenetriamine penta(methylene phosphonate), and the triamine- and tetramine-polymethylene phosphonates with 2-4 methylene groups between each N atom, at least 2 of the numbers of methylene groups in each phosphonate being different. Other suitable dispersion agents include lignin, or derivatives of lignin such as lignosulfonate and naphthalene sulfonic acid and derivatives.

The component of the composition can include an emulsion breaker. The composition can comprise from about 0.1 to 10 wt. %, from about 0.5 to 5 wt. %, or from about 0.5 to 4 wt. % of an emulsion breaker, based on total weight of the composition. Suitable emulsion breakers include, but are not limited to, dodecylbenzylsulfonic acid (DDBSA), the sodium salt of xylenesulfonic acid (NAXSA), epoxylated and propoxylated compounds, anionic, cationic and non-ionic surfactants, and resins, such as phenolic and epoxide resins.

The component of the composition can include a hydrogen sulfide scavenger. The composition can comprise from about 1 to 50 wt. %, from about 1 to 40 wt. %, or from about 1 to 30 wt. % of a hydrogen sulfide scavenger, based on total weight of the composition. Suitable additional hydrogen sulfide scavengers include, but are not limited to, oxidants (e.g., inorganic peroxides such as sodium peroxide or chlorine dioxide); aldehydes (e.g., of 1-10 carbons such as formaldehyde, glyoxal, glutaraldehyde, acrolein, or methacrolein; triazines (e.g., monoethanolamine triazine, monomethylamine triazine, and triazines from multiple amines or mixtures thereof); condensation products of secondary or tertiary amines and aldehydes, and condensation products of alkyl alcohols and aldehydes.

The component of the composition can include a gas hydrate inhibitor. The composition can comprise from about 0.1 to 25 wt. %, from about 0.1 to 20 wt. %, or from about 0.3 to 20 wt. % of a gas hydrate inhibitor, based on total weight of the composition. Suitable gas hydrate inhibitors include, but are not limited to, thermodynamic hydrate inhibitors (THI), kinetic hydrate inhibitors (KHI), and anti-agglomerates (AA). Suitable thermodynamic hydrate inhibitors include, but are not limited to, sodium chloride, potassium chloride, calcium chloride, magnesium chloride, sodium bromide, formate brines (e.g. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol)), methanol, propanol, ethanol, glycol ethers (such as diethyleneglycol monomethylether, ethyleneglycol monobutylether), and alkyl or cyclic esters of alcohols (such as ethyl lactate, butyl lactate, methylethyl benzoate).

The component of the composition can include a kinetic hydrate inhibitor. The composition can comprise from about 5 to 30 wt. %, from about 5 to 25 wt. %, or from about 10 to 25 wt. % of a kinetic hydrate inhibitor, based on total weight of the composition. Suitable kinetic hydrate inhibitors and anti-agglomerates include, but are not limited to, polymers and copolymers, polysaccharides (such as hydroxyethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, and proteins.

The component of the composition can include a biocide. The composition can comprise from about 0.1 to 10 wt. %, from about 0.5 to 5 wt. %, or from about 0.5 to 4 wt. % of a biocide, based on total weight of the composition. Suitable biocides include, but are not limited to, oxidizing and non-oxidizing biocides. Suitable non-oxidizing biocides include, for example, aldehydes (e.g., formaldehyde, glutaraldehyde, and acrolein), amine-type compounds (e.g., quaternary amine compounds and cocodiamine), halogenated compounds (e.g., 2-bromo-2-nitropropane-3-diol (Bronopol) and 2-2-dibromo-3-nitrilopropionamide (DB-NPA)), sulfur compounds (e.g., isothiazolone, carbamates, and metronidazole), and quaternary phosphonium salts (e.g., tetrakis(hydroxymethyl)-phosphonium sulfate (THPS)). Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, and peroxides.

The component of the composition can include a pH modifier. The composition can comprise from about 0.1 to 20 wt. %, from about 0.5 to 10 wt. %, or from about 0.5 to 5 wt. % of a pH modifier, based on total weight of the composition. Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include sodium hydroxide, potassium hydroxide, calcium hydroxide, calcium oxide, sodium carbonate, potassium carbonate, sodium bicarbonate, potassium bicarbonate, magnesium oxide, and magnesium hydroxide.

The component of the composition can include a surfactant. The composition can comprise from about 0.1 to 10 wt. %, from about 0.5 to 5 wt. %, or from about 0.5 to 4 wt. % of a surfactant, based on total weight of the composition. Suitable surfactants include, but are not limited to, anionic surfactants and nonionic surfactants. Anionic surfactants include alkyl aryl sulfonates, olefin sulfonates, paraffin sulfonates, alcohol sulfates, alcohol ether sulfates, alkyl aesthetic enhancing agents (i.e., dyes, odorants, perfumes), or other additives suitable for formulation with a corrosion inhibitor composition, and mixtures thereof. Additional agents or additives will vary according to the particular corrosion inhibitor composition being manufactured and its intend use as one skilled in the art will appreciate.

Alternatively, the compositions can not contain any of the additional agents or additives.

Additionally, the compound of Formula I can be formulated into a treatment fluid comprising the following components. These formulations include the ranges of the components listed and can optionally include additional agents.

| Component | 1 | 2 | 3 | 4 | 5 | 6 | 7 | 8 | 9 | 10 | 11 | 12 |
|---|---|---|---|---|---|---|---|---|---|---|---|---|
| Compound of Formula I | 30-90 | 30-90 | 30-90 | 30-90 | 30-90 | 30-90 | 65-85 | 65-85 | 65-85 | 65-85 | 65-85 | 30-90 |
| Organic solvent | 10-35 | | | | | | 10-35 | | | | | 10-35 |
| Corrosion inhibitor | 0.1-20 | 0.1-20 | | | | | 0.1-20 | 0.1-20 | | | | 0.1-20 |
| Asphaltene inhibitor | 0.1-5 | 0.1-5 | 0.1-5 | 0.1-5 | | | 0.1-5 | 0.1-5 | 0.1-5 | | | 0.1-5 |
| Paraffin inhibitor | | | | | | | | | | | | |
| Scale inhibitor | 1-10 | 1-10 | 1-10 | 1-10 | 1-10 | | 1-10 | 1-10 | 1-10 | 1-10 | | 1-10 |
| Emulsifier | | | | | | | | | | | | |
| Water clarifier | | | | | | | | | | | | |
| Dispersant | | | | | | | | | | | | |
| Emulsion breaker | | | | | | | | | | | | |
| Gas hydrate inhibitor | | | | | | | | | | | | 0.1-25 |
| Biocide | 0.5-5 | 0.5-5 | 0.5-5 | 0.5-5 | 0.5-5 | 0.5-5 | 0.5-5 | 0.5-5 | 0.5-5 | 0.5-5 | 0.5-5 | |
| pH modifier | | | | | | | | | | | | |
| Surfactant | | | | | | | | | | | | |

| Component | 13 | 14 | 15 | 16 | 17 | 18 | 19 | 20 | 21 | 22 | 23 | 24 |
|---|---|---|---|---|---|---|---|---|---|---|---|---|
| Compound of Formula I | 30-90 | 30-90 | 30-90 | 30-90 | 30-90 | 30-90 | 65-85 | 65-85 | 65-85 | 65-85 | 65-85 | 65-85 |
| Organic solvent | | | | | | | | | | | | |
| Corrosion inhibitor | 0.1-20 | 0.1-20 | 0.1-20 | 0.1-20 | 0.1-20 | 0.1-20 | 0.1-20 | 0.1-20 | 0.1-20 | 0.1-20 | 0.1-20 | 0.1-20 |
| Asphaltene inhibitor | 0.1-5 | | | | | | 0.1-5 | | | | | |
| Paraffin inhibitor | | | | | | | | | | | | |
| Scale inhibitor | 1-10 | 1-10 | | | 1-10 | | 1-10 | 1-10 | | | | 1-10 |
| Emulsifier | | | | | | | | | | | | |
| Water clarifier | | | | | | | | | | | | |
| Dispersant | | | | | | | | | | | | |
| Emulsion breaker | | | | | | | | | | | | |
| Gas hydrate inhibitor | 0.1-25 | 0.1-25 | 0.1-25 | | | | 0.1-25 | 0.1-25 | 0.1-25 | | 0.1-25 | |
| Biocide | | | | | | 0.5-5 | 0.5-5 | 0.5-5 | 0.5-5 | 0.5-5 | | |
| pH modifier | | | | | | | | | | | | |
| Surfactant | | | | | | | | | | | | | carboxylates and alkyl ether carboxylates, and alkyl and ethoxylated alkyl phosphate esters, and mono and dialkyl sulfosuccinates and sulfosuccinamates. Nonionic surfactants include alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, alkyl polyglucosides, polyalkoxylated glycerides, sorbitan esters and polyalkoxylated sorbitan esters, and alkoyl polyethylene glycol esters and diesters. Also included are betaines and sultanes, amphoteric surfactants such as alkyl amphoacetates and amphodiacetates, alkyl amphopropionates and amphodipropionates, and alkylim inodipropionate.

Paraffin inhibitor compositions made according to the invention can further include additional functional agents or additives that provide a beneficial property. For example, additional agents or additives can be sequestrants, solubilizers, lubricants, buffers, cleaning agents, rinse aids, preservatives, binders, thickeners or other viscosity modifiers, processing aids, carriers, water-conditioning agents, foam inhibitors or foam generators, threshold agents or systems, Unless otherwise indicated, an alkyl group as described herein alone or as part of another group is an optionally substituted linear saturated monovalent hydrocarbon substituent containing from one to sixty carbon atoms and preferably one to thirty carbon atoms in the main chain or eight to thirty carbon atoms in the main chain, or an optionally substituted branched saturated monovalent hydrocarbon substituent containing three to sixty carbon atoms, and preferably eight to thirty carbon atoms in the main chain. Examples of unsubstituted alkyl groups include methyl, ethyl, n-propyl, i-propyl, n-butyl, i-butyl, s-butyl, t-butyl, n-pentyl, i-pentyl, s-pentyl, t-pentyl, and the like.

The terms "aryl" or "ar" as used herein alone or as part of another group (e.g., aralkyl) denote optionally substituted homocyclic aromatic groups, preferably monocyclic or bicyclic groups containing from 6 to 12 carbons in the ring portion, such as phenyl, biphenyl, naphthyl, substituted phenyl, substituted biphenyl or substituted naphthyl. Phenyl and substituted phenyl are the more preferred aryl. The term "aryl" also includes heteroaryl.

The term "substituted" as in "substituted aryl," "substituted alkyl," and the like, means that in the group in question (i.e., the alkyl, aryl or other group that follows the term), at least one hydrogen atom bound to a carbon atom is replaced with one or more substituent groups such as hydroxy (—OH), alkylthio, phosphino, amido (—CON($R_A$)($R_B$), wherein $R_A$ and $R_B$ are independently hydrogen, alkyl, or aryl), amino(—N($R_A$)($R_B$), wherein $R_A$ and $R_B$ are independently hydrogen, alkyl, or aryl), halo (fluoro, chloro, bromo, or iodo), silyl, nitro (—$NO_2$), an ether (—$OR_A$ wherein $R_A$ is alkyl or aryl), an ester (—OC(O)$R_A$ wherein $R_A$ is alkyl or aryl), keto (—C(O)$R_A$ wherein $R_A$ is alkyl or aryl), heterocyclo, and the like. When the term "substituted" introduces a list of possible substituted groups, it is intended that the term apply to every member of that group. That is, the phrase "optionally substituted alkyl or aryl" is to be interpreted as "optionally substituted alkyl or optionally substituted aryl."

Having described the invention in detail, it will be apparent that modifications and variations are possible without departing from the scope of the invention defined in the appended claims.

EXAMPLES

The following non-limiting examples are provided to further illustrate the present invention.

Example 1

Alcohols and Esters Tested

The following example was performed with a variety of alcohols and esters that vary in chain length.

The alcohol tested was 1-dodecanol (identified as composition A, hereinafter). The ester tested was dodecyl acetate (identified as composition B, hereinafter). The performance of the alcohol and ester were compared to ethoxylated 2-ethyl hexanol (commercially available from BASF as Product Lutensol XP80 and identified hereinafter as composition C) and a heavy fuel flow improver product (commercially available from Nalco Champion as Product No. EC5351A and identified hereinafter as composition D).

Example 2

Turbiscan Tests

Crude oil samples from a formation within the United States were collected that exhibited a wax appearance temperature of about 40° C.

A crude oil sample (20 mL) was added to a specimen cup. A fatty alcohol or ester was then added at 1,000 ppm. Compositions A and B were individually tested. The specimen cup was sealed with a lid and placed in an oven at 150° F. The specimen cup was removed from the oven after 15 minutes and thoroughly mixed. The specimen cup was allowed to cool to room temperature. A sample (20 mL) was transferred to a TURBISCAN vial.

The treated samples were then submitted for TURBISCAN analysis to measure changes in the formation of solids as a function of time.

The results are visually depicted in FIG. 1.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawing shall be interpreted as illustrative and not in a limiting sense.

What is claimed is:

1. A method for reducing paraffin or wax deposition in crude oil during processing, storage, or transportation, the method comprises contacting the crude oil with a paraffin or wax deposition-inhibiting composition in an amount effective to reduce paraffin or wax deposition, wherein the paraffin or wax deposition-inhibiting composition consists of a compound of Formula (I):

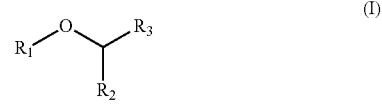

wherein
$R_1$ is hydrogen or —C(O)$R_4$;
$R_2$ is hydrogen or alkyl;
$R_3$ is $C_8$ to $C_{60}$ alkyl or $C_8$ to $C_{60}$ alkenyl; and
$R_4$ is alkyl;
whereby the paraffin or wax deposition in crude oil is reduced.

2. The method of claim 1, wherein the paraffin or wax deposition is reduced by suspension of the paraffin or wax in the crude oil.

3. The method of claim 2, wherein $R_1$ is hydrogen.

4. The method of claim 2, wherein $R_1$ is —C(O)$R_4$ and $R_4$ is $C_1$ to $C_8$ alkyl.

5. The method of claim 4, wherein $R_1$ is acetyl.

6. The method of claim 2, wherein $R_2$ is hydrogen.

7. The method of claim 2, wherein $R_2$ is methyl or ethyl.

8. The method of claim 2, wherein $R_3$ is $C_8$ to $C_{24}$ alkyl or $C_8$ to $C_{24}$ alkenyl.

9. The method of claim 8, wherein $R_3$ is octyl, nonyl, decyl, undecyl, dodecyl, tetradecyl, hexadecyl, octadecyl, icosyl, docosyl, tetracosyl, or hexacosyl.

10. The method of claim 2, wherein the compound of Formula I comprises 1-decanol, 1-undecanol, 1-dodecanol, 1-tetradecanol, 1-hexadecanol, 1-octadecanol, 2-undecanol, 2-dodecanol, 3-dodecanol, 2-heptadecanol, 3-octadecanol, decyl acetate, undecyl acetate, dodecyl acetate, tetradecyl acetate, hexadecyl acetate, ocetadecyl acetate, undecan-2-yl acetate, dodecan-3-yl acetate, heptadecan-2-yl acetate, octadecan-3-yl acetate, or a combination thereof.

11. The method of claim 10, wherein the compound of Formula I comprises dodecyl acetate, 1-dodecanol, or a combination thereof.

12. The method of claim 2, wherein $R_1$ is —C(O)$R_4$; $R_2$ is hydrogen; $R_3$ is $C_{12}$ to $C_{616}$ alkyl; and $R_4$ is methyl.

13. The method of claim 10, wherein the compound of Formula I comprises dodecyl acetate.

14. The method of claim 10, wherein the compound of Formula I comprises 1-dodecanol.

15. The method of claim 1, wherein compound of Formula I is a liquid at moderate ambient temperatures.

16. The method of claim 15, wherein the moderate ambient temperatures is from about 20° C. to about 43° C.

17. The method of claim 1, wherein the crude oil has a wax appearance temperature of about 20° C. to about 50° C.

18. The method of claim 1, wherein the composition is contacted to crude oil at a concentration from about 1 ppm to about 10,000 ppm based on the total weight of the crude oil.

19. The method of claim 18, wherein the composition is contacted to crude oil at a concentration from about 100 ppm to about 5,000 ppm.

20. The method of claim 19, wherein the composition is contacted to crude oil at a concentration from about 200 ppm to about 1,000 ppm.

\* \* \* \* \*

UNITED STATES PATENT AND TRADEMARK OFFICE
CERTIFICATE OF CORRECTION

PATENT NO. : 10,344,230 B2
APPLICATION NO. : 15/705762
DATED : July 9, 2019
INVENTOR(S) : Kim R. Solomon Page 1 of 1

It is certified that error appears in the above-identified patent and that said Letters Patent is hereby corrected as shown below:

On the Title Page

Item (57), Column 2 under "Abstract", Lines 5-6:
"or was deposition" should read "or wax deposition"

In the Claims

On Column 14, Claim 10, Line 52:
"ocetadecyl" should read "octadecyl"

On Column 14, Claim 12, Line 59:
"C616 alkyl;" should read "C16 alkyl;"

Signed and Sealed this
Eighth Day of December, 2020

Andrei Iancu
*Director of the United States Patent and Trademark Office*